United States Patent [19]

Bray

[11] Patent Number: 4,903,973
[45] Date of Patent: Feb. 27, 1990

[54] FLUID CONTROLLED STEERING STABILIZER

[76] Inventor: Todd E. Bray, 1529 Ace McMillian Rd., Dacula, Ga. 30211

[21] Appl. No.: 221,274

[22] Filed: Jul. 19, 1988

[51] Int. Cl.[4] .............................................. B62D 5/10
[52] U.S. Cl. ........................................ 280/89; 280/90
[58] Field of Search .................................. 280/89, 90

[56] References Cited

U.S. PATENT DOCUMENTS 4,410,193 10/1983 Howard ................................. 280/90

Primary Examiner—Kenneth R. Rice
Attorney, Agent, or Firm—Needle & Rosenberg

[57] ABSTRACT

A fluid controlled steering stabilizer is provided, comprising a cylindrical housing having a head end and a sealed butt end attachable to a steerable lift axle. A center member divides the interior of the housing into two chambers. A floating piston is provided within the butt end chamber, and a rod piston having a piston rod extending at one end through the otherwise sealed head end is provided in the head end chamber. The piston rod slidably extends through a hole in the rod piston to contact the floating piston, and the exposed end of the rod piston is attached to a tie rod. Means for providing fluid into the chambers force the pistons toward the center member and place the stabilizer in a positive centered position.

17 Claims, 3 Drawing Sheets

4,903,973

FLUID CONTROLLED STEERING STABILIZER

BACKGROUND OF THE INVENTION

The present invention relates to the trucking industry, and more particularly to a pneumatic or hydraulic controlled stabilizer assembly for the steering mechanism in vehicles.

Recently, the Federal Government issued new weight restrictions and regulations for trucks using federal highways. These laws make it economically feasable to add a third axle to a vehicle, which in turn permits more payload to be carried. These third or "lift" axles, however, have inherent problems which cause premature tire wear and frame stress. To avoid such problems, manufacturers of these suspensions have developed a steerable lift axle that casters, and which is not connected to a steering mechanism. Many states have in fact recently passed laws requiring lift axles to be steerable. A problem plaguing the users of such lift wheels is one of instability and a lack of centering. It has been found that standard-type steering stabilizers do not solve this problem.

Steering stabilizers are used in trucks and other vehicles to reduce sway and to stabilize front end suspensions. These devices also dampen shocks resulting from external objects meeting the wheels during travel. In the past, such stabilizers have been automotive shock absorber devices designed strictly for steerable axles that are connected to a steering mechanism. To date, the only assemblies provided steerable, liftable axles have been automotive shock absorbers used in conjunction with coil springs. A problem exists in that such combination assemblies have proved unreliable in controlling the axles, when applied to liftable axles.

A related problem involves the need to maintain the lift wheels of a truck or other vehicle in a straight position when the wheels are raised. This need has been met in the past by using steering dampers in conjunction with a two-coiled spring centering system. Too often, however, one side of the system would overpower the other due to spring breakage or fatigue and destroy the bias or centering capability. This would result in marked shaking, vibration or wobble of the vehicle; and once this shimmying movement begins, the springs accentuate the side-to-side motion, due to their inherent design.

There exists a need, therefore, for a steering stabilizer which can be used on steerable, liftable axles in which the movable steering linkage is not connected to a steering mechanism.

There also exists a need for such a stabilizer in which it is impossible for one side of the system to overpower the other and thereby destroy the bias for the positive center position.

There exists a further need for a steering stabilizer that eliminates the use of springs, which tend to suffer fatigue and breakage, along with accentuating the side-to-side motion.

SUMMARY OF THE INVENTION

The above disadvantages are overcome by the present invention of a fluid controlled stabilizer assembly for use on a steerable third axle of a vehicle. The present stabilizer utilizes fluid, such as air or hydraulic fluid, to bias a pair of movable pistons to positive center point within a cylinder, and thereby allows tracking of the truck axle in the forward direction and locking of the truck axle in the reverse direction when needed.

A cylindrical housing forms the main body of the device, and has a butt end on one side and a head end on the other. A butt plate seals the opening at the butt end of the cylinder, and a head piece is provided to seal the opening at the head end of the cylinder. A connecting bar and eye combination are securely fastened to the butt plate for fastening the device to the axle.

Located at the approximate centerpoint of the cylinder is a center member, preferably a snap ring, which is held in stationary position by being fit inside a groove cut along the cylinder's inner diameter. The center member therefore divides the interior of the cylinder into a pair of chambers, i.e. a butt end chamber and a head end chamber. Located within the butt end chamber is a first, preferably free, floating piston, which is made to tight tolerances to fit inside the cylinder so as to be forced towards the snap ring upon increased fluid pressure between the piston and the butt plate.

Located within the head end chamber is a second piston, also made to tight tolerances to fit inside the cylinder so that the second piston is forced towards the snap ring upon increased fluid pressure in the head end chamber. A piston rod originates between the two pistons with a retainer assembly and passes through the second piston and extends through the head end chamber and out an opening in the head piece. The piston rod with retainer assembly can then be pushed by said first piston and/or pulled by said second piston. An eye is attached to the exposed end of the piston rod for attaching the piston rod to the tie rod of the vehicle. It is seen that the tie rod is moved laterally, with the rod piston.

A tube is provided to the cylinder for carrying the fluid, such as compressed air or hydraulic fluid, from an outside source to the cylinder. A fluid inlet is provided through which fluid is taken from an outside source and brought to the feed tube. A first fluid conduit carries fluid from the feed tube and deposits it into the butt end chamber at a point between the first piston and the butt plate. A second fluid conduit carries fluid from the feed tube and deposits it into the head end chamber at a point between the second piston and the head piece. The pressure of the fluids in the chambers force the first piston and the second piston towards the snap ring, thereby providing and maintaining centering. The degree of centering can be controlled by altering the fluid pressure provided to the chambers. The present device, therefore, self centers pneumatically or hydraulically. The centering power can be adjusted by varying the fluid pressure delivered to the device, and dampening can be ordered to different specifications.

The present invention has many advantages over those stabilizers commonly in use. Unlike spring centering systems, the present invention maintains a constant centering pressure throughout the full stroke and cannot create its own steering desires due to spring fatigue or breakage. Because the device has separate centering and dampening subassemblies, a vehicle having it applied will have less probability of having an uncontrollable axle. This results in increased safety due to an increased ability to keep the axle centered. Furthermore, the device can be used to lock the axle while the vehicle is in reverse, thereby providing increased safety and ease in backing up. The device exhibits strong linear forces, and provides a large amount of piston travel in a relatively short area. Additionally, the present invention is easily repairable, particularly because of the seals being simply designed and accessible.

It is an object of the present invention to provide a steering stabilizer which can be used on steerable, liftable axles in which the movable steering linkage is not connected to a steering mechanism.

It is also an object of the present invention to provide a steering stabilizer in which it is impossible for one side of the system to overpower the other and thereby destroy the bias to the positive center position.

It is a further object of the present invention to provide a steering stabilizer that eliminates the use of springs, which tend to suffer fatigue and breakage and accentuate side-to-side motion.

These and other objects and advantages of the present invention should be apparent from the following detailed description and figures.

DETAILED DESCRIPTION OF THE INVENTION

Figure 1:
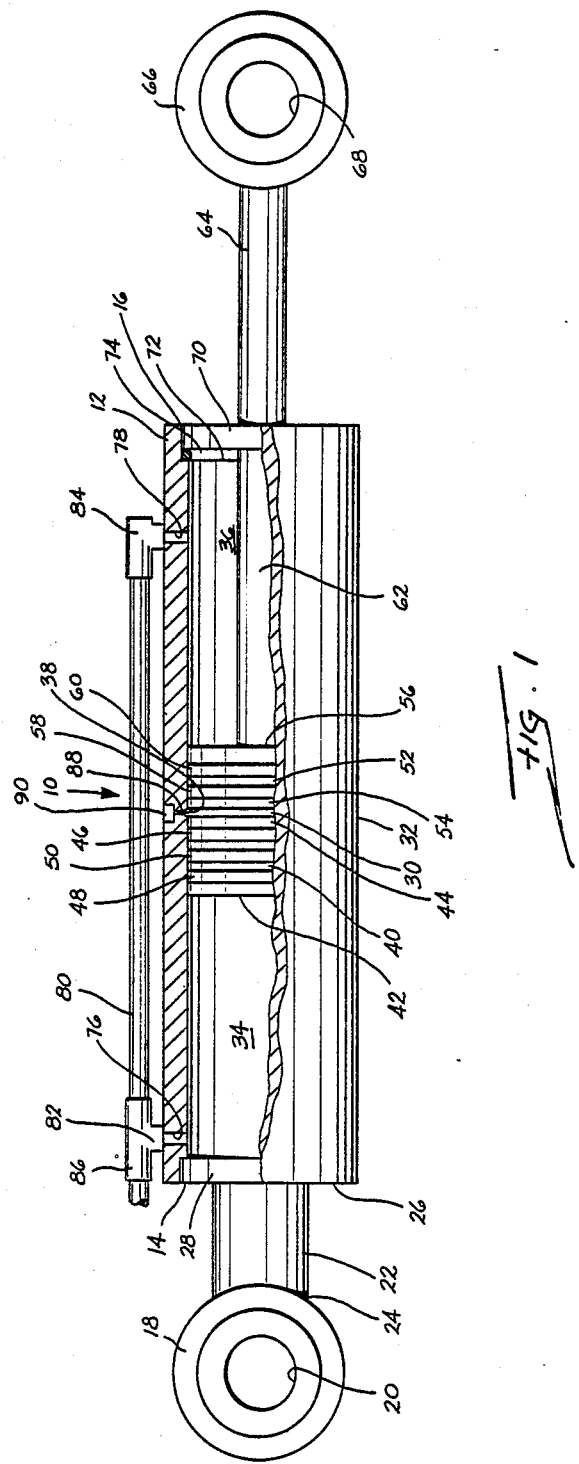
FIG. 1 is a central vertical longitudinal cross-section through the stabilizer of the present invention.

The device of the present invention is now described according to the figures. Referring to FIG. 1, the device 10 has a cylindrical housing 12, which is tubular and can be made to any length to accomodate different amounts of travel necessary for different applications. The housing has a butt end 14 and a head end 16. Firmly attached to the butt end 14 of the housing 12 are means for attaching the device 10 to a fixed point on a steerable axle of the vehicle. The means preferably comprise a first connecting member 18 having an eye 20 which permits attachment to the axle, and a connecting bar 22 attached at one end 24 to the first connecting member 18 and at the other end 26 to the butt end 14 of the cylinder 12. A butt plate 28 is sealingly attached over the opening of the butt end 14 to provide both a point of attachment for the connecting bar 22 and means for preventing loss of air or hydraulic fluid through the opening, as discussed in more detail below.

A center member 30, preferably a snap ring, is provided inside the housing 12 at the housing midpoint 32, thereby dividing the interior space into two equally sized chambers, i.e., a butt end chamber 34 and a head end chamber 36. The snap ring 30 is held in stationary position by being partially fit inside a snap ring groove 38 cut along the inner diameter of the housing 12. Located within the butt end chamber 34 is a first piston 40. The first piston 40 preferably is an unattached, free-floating piston. The first piston 40 has a first end 42 facing the butt end 14 of the housing 12 and a second end 44 facing the snap ring 30. The first piston 40 is preferably made to tight tolerances to fit inside the butt end chamber 34 of the housing 12, and has a pair of wear rings 46, 48 around its outer diameter for providing a good bearing surface. Additionally, a first piston seal 50 is provided around the outer diameter of the first piston 40 for preventing the flow of fluid (air or hydraulic oil) from getting past the piston to the snap ring 30. Positive force and constant pressure from an outside fluid source on the first end 42 of the first piston 40 will therefore force the piston 42 towards the snap ring 30.

Figure 2:
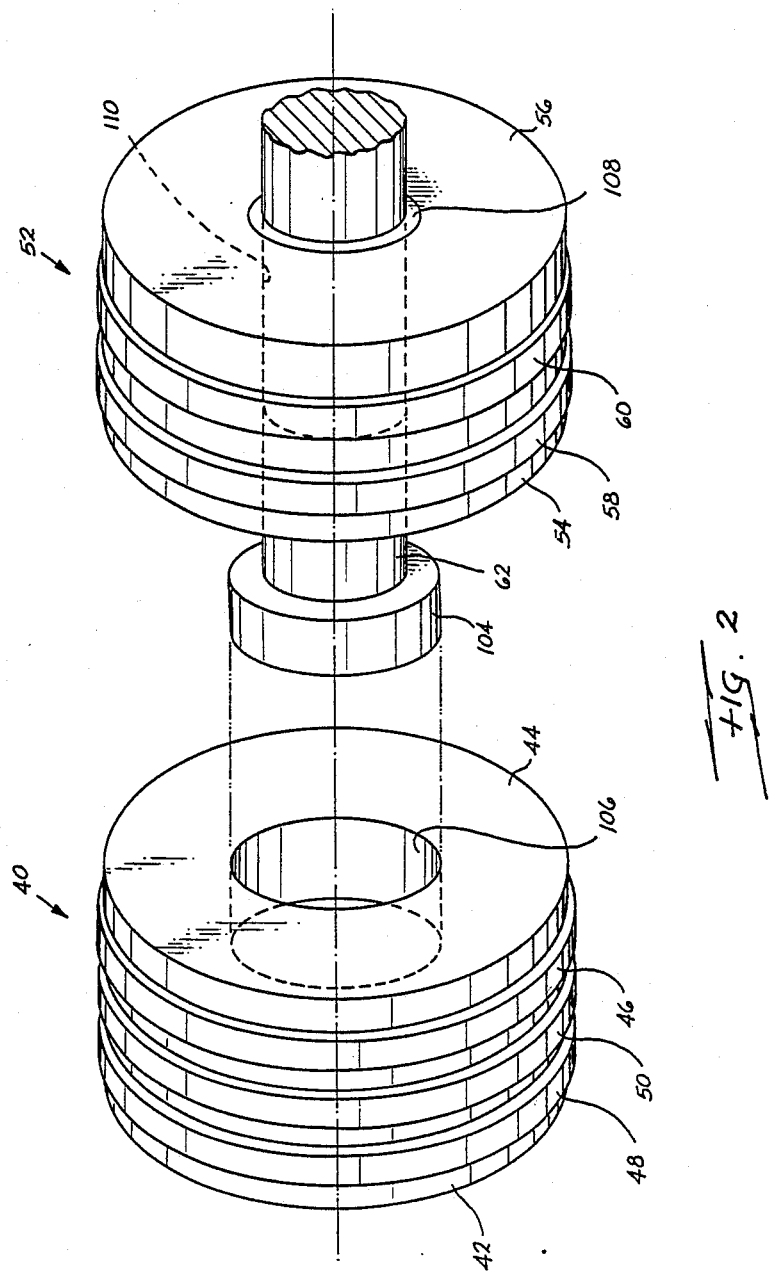
FIG. 2 is a plan view of the piston and piston rod assembly.

Located within the head end chamber 36 is a cylindrical second piston 52, also made to tight tolerances so as to fit inside the housing 12. The second piston 52 has a first end 54 facing the snap ring and a second end 56 facing the head end 16 of the housing 12. A wear ring 58 is provided around the diameter of the piston 52, as is a second piston seal 60 for preventing the flow of fluid past the piston 52 towards the snap ring 30. As shown in FIG. 2, a piston rod 62 passes through hole 110 bored through the center of second piston 52. A seal 108 is affixed t second end 56 of second piston 52 to prevent the passage of air or fluid through said hole 110. The head end of said piston rod 52 is provided with a knob 104 which is larger in diameter than hole 110 and fits securely into a groove 106 cut into the second end 44 of the first piston 40.

As piston rod 62 is pushed towards the head end 16 of the device, knob 104 engages first piston 40 and pushes said first piston 40 towards the butt end 14. As the piston rod 62 is pulled towards the head end 16 of the device knob 104 engages the face end 54 of the second piston 52 and pulls said second piston 52 towards the head end 16. Located at the exposed end 64 of the piston rod 62 are means for attaching the device 10 to the tie rod of the vehicle. These means may comprise a second connecting member 66 having an eye 68 through which the connection to the tie rod is made. A head piece 70 is provided to seal the opening at the housing head end 16. An 0-ring groove 72 may be cut into the inner surface of the housing 12 near the head piece 70 and an 0-ring 74 installed therein to prevent air from escaping the cylinder 12 through the head end 16. A wiper groove may be cut on the outside face of the head piece 70, and a wiper installed therein to prevent outside material such as dust and dirt from entering the cylinder 12.

Means for providing air or hydraulic pressure to the chambers 34, 36 is provided. Standard truck air may be used for convenience, or hydraulic fluid may be used for increased linear forces. The cylinder 12 has a first fluid conduit 76 through its wall leading to the butt end chamber 34 and a second fluid conduit 78 leading to the head end chamber 36. A fluid feed tube 80 is provided, lying parallel to the outer surface of the cylinder 12, and having a first connection 82 to the first fluid conduit 76 and a second connection 84 to the second fluid conduit 78. A fluid inlet 86 for providing air or hydraulic fluid to the fluid feed tube 80 is located at a point adjacent the first fluid conduit 76. Upon connection to an outside power source (not shown), such as an air pump or hydraulic pump, equal pressure is provided to each chamber 34, 36 through the conduits 76, 78 to force the first piston 40 and the second piston 52 to the snap ring 30, thus providing and maintaining centering.

A breather hole 88 is provided through the cylinder 12, preferably at the location of the snap ring groove 38. A check valve 90 is located within the breather hole 88 for allowing fluid to pass out of the cylinder 12 in the event one of the internal seals 50, 60 develope a leak. This allows the pressure in the two chambers 34, 36 to remain equal and enables the device 10 to continue proper operation in event of such breakdown.

Figure 3:
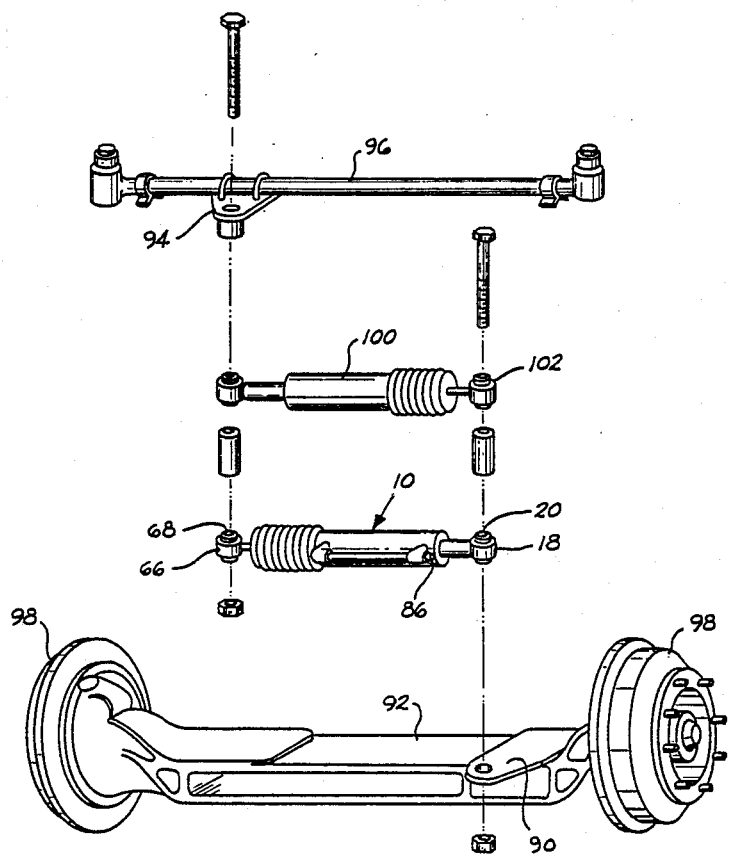
FIG. 3 is a plan view of a vehicle steering mechanism equipped with the stabilizer of the present invention.

FIG. 3 shows the steering stabilizer 10 of the present invention installed on a vehicle. An anchor bracket 90 is attached to a steerable, liftable axle 92. A tie rod bracket 94 is attached to the tie rod 96. The eye 20 of the first connecting member 18 is bolted or otherwise attached to the anchor bracket 90 and the eye 68 of the second connecting member 66 is attached to the tie rod bracket 94. Preferably, the wheels 98 of the vehicle are centered when the centered stabilizer 10 is attached. An outside source of fluid is attached to the fluid inlet 86. A second, more traditional type of stabilizer 100 is then attached between the axle 92 and tie rod 96 such that its extendable piston 102 end is attached to the anchor bracket 90. However, any means for connecting the piston rod 62 to a selected one of the axle 92 or tie rod 96 may be used. Also, any means for connecting the butt end 14 of the housing 12 to the remaining one of the axle 92 or tie rod 96 may be used. It can be seen, therefore, that centering is controllably provided to the axle 90 by adding or subtracting air or hydraulic fluid as desired.

I claim:

1. A fluid controlled steering stabilizer for a nonsteerable axle of a vehicle having a tie rod associated with said axle comprising:
   (a) a housing;
   (b) first and second chambers formed within said housing;
   (c) a first piston freely slidable within said first chamber of said housing;
   (d) a second piston freely slidably within said second chamber of said housing and having a hole through its center;
   (e) a piston rod slidably extending through said hole of said second piston having a first end extending through said housing at a first end for connecting said piston rod to an axle or tie rod and a second end capable of contacting said first piston;
   (f) means for providing fluid to said chambers for maintaining said first piston and said second piston toward the center of said housing to inhibit movement of said axle relative to said tie rod;
   (g) means for connecting the remaining end of said housing to the remaining one of said axle or tie rod;
   (h) a snap ring provided in a radially extending snap ring groove located at the approximate centerpoint of said housing between said first piston and said second piston to provide a positive centerpoint to said stabilizer; and
   (i) a check valve located in a breather hole entering said housing at said snap ring groove for allowing excess fluid to pass out of said housing.

2. The steering stabilizer of claim 1, and further comprising a check valve located in a breather hole provided through said housing at a point between said first piston and said second piston for allowing excess pressure to pass out of said housing.

3. The steering stabilizer of claim 1, and further comprising a snap ring provided in a snap groove located at the approximate centerpoint of said housing to provide a positive centerpoint to said stabilizer.

4. The steering stabilizer of claim 2, and further comprising a snap ring provided in a snap groove located at the approximate center point of said housing and said check valve is located in a breather hole, said breather hole entering said housing at said snap groove.

5. The steering stabilizer of claim 1, wherein said housing is comprised of a butt end and a head end through which said piston rod extends, and further comprising a butt plate located at said butt end of said housing for sealing said butt end.

6. The steering stabilizer of claim 5, and further comprising a head piece located at the head end of said housing for sealing said head end, said head piece having a hole through which said piston rod extends outside said housing.

7. The steering stabilizer of claim 5, and further comprising a connecting bar attached to said butt plate at one end and to a first connecting member on the other, said first connecting member having an eyelet for attaching to one of said axle or said tie rod.

8. The steering stabilizer of claim 1, wherein said means for providing fluid to said chambers is comprised of:
   (a) a fluid feed tube for carrying said fluid;
   (b) an inlet for receiving fluid from an outside source and delivering said fluid to said feed tube;
   (c) a first fluid conduit carrying fluid from said feed tube to said first chamber, said fluid deposited into said first chamber at a point between said housing butt end and said first piston; and
   (d) a second fluid conduit carrying fluid from said feed tube to said second chamber, said fluid deposited into said second chamber at a point between said second piston and said housing head end.

9. The steering stabilizer of claim 8, wherein said inlet is controllable to deliver a predetermined amount of said fluid to said feed tube to adjust the centering power of the stabilizer.

10. The steering stabilizer of claim 1, and further comprising a seal surrounding said first piston for preventing the flow of fluid between said first piston and the interior wall of said housing.

11. The steering stabilizer of claim 1, and further comprising a wear ring on said first piston for providing a good bearing surface for movement of said first piston through said housing.

12. The steering stabilizer of claim 1, and further comprising a seal surrounding said second piston for preventing the flow of fluid between said second piston and the interior wall of said housing.

13. The steering stabilizer of claim 1, and further providing a wiper located on the outside of said housing head end to prevent debris from getting inside said housing.

14. The steering stabilizer of claim 1, wherein said housing is a cylinder, and said first piston and said second piston are cylindrical to fit within tight tolerances within said housing.

15. The steering stabilizer of claim 10, wherein said inlet is capable of receiving both air and hydraulic fluid from an outside source.

16. The steering stabilizer of claim 1, wherein said first piston is free-floating piston.

17. An air controlled steering stabilizer for the nonsteerable axle of a vehicle having a tie rod associated with said axle comprising:
   (a) a housing;
   (b) first and second chambers formed within said housing;
   (c) a first piston freely slidable within said first chamber of said housing;
   (d) a second piston freely slidable within said second chamber of said housing and having a hole through its center;
   (e) a piston rod slidably extending through said hole of said second piston having a first end extending through said housing at a first end for connecting said piston rod to an axle or tie rod and a second end capable of contacting said first piston;
   (f) means for providing air from an air source provided on said vehicle to said chambers for maintaining said first piston and said second piston toward the center of said housing to inhibit movement of said axle relative to said tie rod;

(g) means for connecting the remaining end of said housing to the remaining one of said axle or tie rod;

(h) a snap ring provided in a radially extending snap ring groove located at the approximate centerpoint of said housing between said first piston and said second piston to provide a positive centerpoint to said stabilizer; and (i) a check valve located in a breather hole entering said housing at said snap ring groove for allowing excess air to pass out of said housing.

* * * * *